United States Patent [19]
Hayashi et al.

[11] Patent Number: 5,830,954
[45] Date of Patent: Nov. 3, 1998

[54] METHOD AND APPARATUS FOR CONTROLLING POLYOLEFINE RESIN PRODUCTION PLANT

[75] Inventors: Shigeki Hayashi; Michinori Tayama; Hiroyuki Mizouchi; Hirokazu Katsuyama, all of Ichihara, Japan

[73] Assignee: Mitsui Petrochemical Industries, Ltd., Tokyo, Japan

[21] Appl. No.: 575,612

[22] Filed: Dec. 20, 1995

[30]    Foreign Application Priority Data

Dec. 26, 1994 [JP] Japan .................................. 6-323377

[51] Int. Cl.$^6$ ...................................................... C08F 2/00
[52] U.S. Cl. ................................ 526/60; 526/59; 526/61; 526/351; 526/352
[58] Field of Search ................................ 526/59, 60, 61

[56]    References Cited

U.S. PATENT DOCUMENTS 3,074,920   1/1963   Henderson ................................ 526/59

FOREIGN PATENT DOCUMENTS 62-250010   10/1987   Japan .
5-26135    4/1993    Japan .

OTHER PUBLICATIONS

"No–hands Resin Quality Control" Technology News, Jan H. Schut, Mar. 1992.

Primary Examiner—David W. Wu

[57]    ABSTRACT

The names of a plurality of polyolefine resins are previously registered as index data in a name data base. An optimal operational pattern is stored in an operational pattern table for each combination of the name of a current resin under production and the name of a target resin to be produced. The optimal operation pattern is selected based on the name of the current resin under production and the name of the next target resin to be produced. Based on the selected optimal operational pattern, resin-type change control is executed.

16 Claims, 11 Drawing Sheets

METHOD AND APPARATUS FOR CONTROLLING POLYOLEFINE RESIN PRODUCTION PLANT

BACKGROUND OF THE INVENTION

1. Field of the Invention

The present invention relates to a control method for a production plant for producing plural types of polyolefine resins with a common system. More particularly, this invention relates to a control method and apparatus suitable for a production plant for polyolefine resins such as polyethylene and polypropylene.

2. Description of the Related Art

In a production plant for producing polyolefines such as polyethylene and polypropylene, a distributed control system (hereinafter called "DCS") is typically used as a process control system. There has been a proposal to accomplish high-precision process control by coupling a process computer to this DCS via the system bus of the DCS.

There are multifarious needs for polyolefine resins like polypropylene. In the production process in a production plant for polyolefine resins such as polypropylene, it is common to frequently change the types of resins to be produced from one to another, e.g., from a high impact-strength resin having a high molecular weight to a high flow resin having a low molecular weight, or frequently change one polyolefine resin to a copolymer with another olefine.

To meet such a demand, the present inventor proposed in Unexamined Japanese Patent Publication No. Sho 62-250010 a technique which detects a parameter concerning the physical property of polyethylene with a sensor or gas chromatography, performs operations on the detection value using a computer and controls the production of polyethylene having a predetermined physical property based on the operational results. It is however difficult to adapt this technique to the operational control needed at the time one of multifarious types of polyolefine resins is changed to another.

Parameters involved in changing resins from one type to another in such a polyolefine resin production plant vary depending on the operational conditions.

It is generally known to control the melt flow rate (hereinafter called "MFR") by the amount of hydrogen supply to a polymerization reactor. To change one type of polyolefine resin under production to another in a short period of time for the purpose of increasing the hydrogen concentration in the reactor to reduce the molecular weight, it is efficient to supply a large amount of hydrogen at a time. This approach however increases the activity of the polymerization catalyst in accordance with the increase in hydrogen concentration, causing abnormal polymerization (e.g., an increase in polymerization temperature or polymerization reaction failure) originating from the rapid increase in hydrogen concentration. This is dangerous as well as undesirable because of the amount of polyolefine resins which do not meet proper standards increases.

Further, since the feed rate of hydrogen is closely associated with other parameters like the temperature of the reactor to be controlled, conventional control by the DCS alone is very likely to produce a lot of products which do not meet proper standards, i.e., defects, at the time of changing one type of resin to another. The suppression of the production of products which do not meet the standards therefore demands knowledge-based or experience-based control by skillful operators.

In changing one type of resin to another in a polyolefine resin production plant, conventionally, skillful operators change a plurality of changeable elements based on their knowledge or experience. Those changeable elements are common elements in process data, which should be changed according to a variation in production conditions and which, when changed, would cause other process data to change. The common elements include the hydrogen concentration in a polymerization reactor and a heat transfer coefficient.

If such common elements in process data are found and are used as control parameters to control the operation of changing the types of resins from one to another, it should be possible to suppress the occurrence of products which do not meet the standards and to change the resin type properly and effectively.

SUMMARY OF THE INVENTION

Accordingly, it is an object of the present invention to provide a control method and apparatus for a polyolefine resin production plant, which, when needed, controls an operation of changing resins from one type to another in a polyolefine resin production plant using a proper process data element as a control parameter originating from a change in production conditions, thereby suppressing the occurrence of products which do not meet the standards and ensuring the proper and effective automation for changing the resin type.

A control method for a polyolefine resin production plant according to the first aspect of this invention comprises:

a name registering step of previously registering names of a plurality of polyolefine resins producible by a production system into a name data base as index data;

a pattern storing step of previously storing an operational pattern for an optimal type changing operation as an operational pattern table into a pattern storage for each combination of a name of a current resin under production in a currently running production process by the production system and a name of a next target resin to be produced by the production system;

a pattern selecting step of comparing the name of the current resin with the name of the next target resin to discriminate a combination thereof and selecting an operational pattern corresponding to a discrimination result from the operational pattern table; and a change control step of executing process control according to the operational pattern selected in the pattern selecting step to change a type of a resin to be produced by the production system.

Each operation pattern to be stored in the operational pattern table may include a control target value for each resin type and information on a successive change in a feed rate of a raw material.

The pattern selecting step may include a step of setting a start time for control by the selected operational pattern for a type changing operation to an optimal time for each operational pattern based on a given production end time for a type of a current resin.

The production system may be used to produce multiple types of polyolefine resins different from one another in at least one of a molecular weight and a copolymer composition of polyolefine; and the pattern storing step may include a step of registering an optimal operational pattern given for each of a plurality of zones, obtained by previously dividing a hydrogen concentration in a polymerization reactor based on at least a relationship between a hydrogen concentration and activity of a polymerization catalyst, into the operational pattern table.

In the previous case, the production system may be used to produce multiple types of polypropylene resins different from one another in at least one of a molecular weight and a copolymer composition of polypropylene.

According to the second aspect of this invention, there is provided a control method for a polyolefine resin production plant for continuously changing a composition of a supplied element in a polymerization reactor for continuous polymerization to thereby produce different types of polymers, which method comprises:

a change control step of changing a control parameter based on an operational pattern by a changing operation model for each of previously stored resin names at a time one type of resin is changed to another in the continuous polymerization;

a monitor step of always detecting and monitoring a sub-parameter which changes in accordance with a change in the control parameter; and a fuzzy control step of performing fuzzy control of an operation based on the change control step in such a manner that when a predetermined period of time passes after a change in the control parameter, the control parameter and the sub-parameter approach target values corresponding to a target resin type to be changed.

The fuzzy control step may include:

an operation step of performing a fuzzy operation on a sub-parameter detected by the monitor step to obtain information on the control parameter; and a control step of changing the control parameter obtained in the operation step.

The predetermined period of time may be a time from a point at which changing a resin type starts to a point at which the target values are set to values according to a target resin type to be changed after overaction of the control parameter.

In the previous case, the method may further include a step of changing the control parameter to control only a pressure in the polymerization reactor as the sub-parameter during the predetermined period of time.

The operational patterns may be obtained based on past production achievements.

The polyolefines may be product selected from polypropylenes, polyethylenes and polyethylene waxes.

The control parameter may be a feed rate of hydrogen.

The control parameter may be a feed rate of a catalyst.

The control parameter may be a feed rate of at least one of α-olefines having 2–8 carbon atoms.

The sub-parameter may be one of a ratio of hydrogen to propylene and a ratio of hydrogen to ethylene.

The sub-parameter may be at least one of a pressure and a temperature in the polymerization reactor.

A control apparatus for a polyolefine resin production plant according to the third aspect of this invention comprises:

a production system capable of producing plural types of polyolefine resins;

a name data base section for previously registering names of a plurality of polyolefine resins producible by the production system as index data;

a pattern storage for previously storing an operational pattern for an optimal type changing operation as an operational pattern table for each combination of a name of a current resin under production in a currently running production process by the production system and a name of a next target resin to be produced by the production system;

a pattern selector for comparing the name of the current resin with the name of the next target resin to discriminate a combination thereof and selecting an operational pattern corresponding to a discrimination result from the operational pattern table; and a change controller for executing process control according to the operational pattern selected by the pattern selector to change a type of a resin to be produced by the production system.

The pattern storage may store an operation pattern including a control target value for each resin type and information on a successive change in a feed rate of a raw material in the operational pattern table.

The pattern selector may further include a function of setting a start time for control by the selected operational pattern for a type changing operation to an optimal time for each operational pattern based on a given production end time for a type of a current resin.

The production system may have a polymerization reactor and may produce multiple types of polyolefine resins different from one another in at least one of a molecular weight and a copolymer composition of polyolefine; and the pattern storage may register an optimal operational pattern given for each of a plurality of zones, obtained by previously dividing a hydrogen concentration in the polymerization reactor based on at least a relationship between a hydrogen concentration and activity of a polymerization catalyst, into the operational pattern table.

In the previous case, the production system may produce multiple types of polypropylene resins different from one another in at least one of a molecular weight and a copolymer composition of polypropylene.

A control apparatus for a polyolefine resin production plant according to the fourth aspect of this invention comprises:

a production system having a polymerization reactor, for continuously changing a composition of a supplied element in the polymerization reactor for continuous polymerization to thereby produce different types of polymers;

a pattern storage for storing an operational pattern by a changing operation model for each resin name;

a change controller for changing a control parameter based on the operational patterns stored in the pattern storage to thereby change one type of resin to another in the continuous polymerization;

a monitor section for always detecting and monitoring a sub-parameter which changes in accordance with a change in the control parameter; and a fuzzy controller for performing fuzzy control of the change controller in such a manner that when a predetermined period of time passes after a change in the control parameter, the control parameter and the sub-parameter approach target values corresponding to a target resin type to be changed.

The fuzzy controller may include:

an operation section for performing a fuzzy operation on a sub-parameter detected by the monitor section to obtain information on the control parameter; and a controller of changing the control parameter obtained in the operation section.

The fuzzy controller may set the predetermined period of time as a time from a point at which changing a resin type starts to a point at which the target values are set to values according to a target resin type to be changed after overaction of the control parameter.

In the previous case, the fuzzy controller may change the control parameter to control only a pressure in the polymerization reactor as the sub-parameter during the predetermined period of time.

As the operational patterns, the pattern storage may store operational patterns obtained based on past production achievements.

The production system may produce one of polypropylenes, polyethylenes and polyethylene waxes as the polyolefines.

The production system may use a feed rate of hydrogen as the control parameter.

The production system may use a feed rate of a catalyst as the control parameter.

The production system may use a feed rate of at least one of α-olefines having 2–8 carbon atoms as the control parameter.

The production system may use one of a ratio of hydrogen to propylene and a ratio of hydrogen to ethylene as the sub-parameter.

The production system may use at least on of a pressure and a temperature in the polymerization reactor as the sub-parameter.

According to the control method and control apparatus for a polyolefine resin production plant which embody this invention, the names of a plurality of polyolefine resins producible by the production system are previously registered into the name data base as index data, an operational pattern for an optimal type changing operation is previously stored as an operational pattern table into the pattern storage for each combination of the name of a current resin under production in a currently running production process by the production system and the name of a next target resin to be produced by the production system, an operational pattern corresponding to the name of the current resin and the name of a given next target resin to be produced is selected from the operational pattern table, and process control according to the selected operational pattern is executed to change the type of a resin to be produced by the production system. This control system can suppress the occurrence of products which do not meet proper standards and can accomplish the proper and effective automation for changing one type of resin to another.

BRIEF DESCRIPTION OF THE DRAWINGS

Other objects and advantages of the invention will become apparent during the following discussion in conjunction with the accompanying drawings, in which.

DETAILED DESCRIPTION OF THE PREFERRED EMBODIMENTS

Control systems for a polyolefine resin production plant according to preferred embodiments of this invention will now be described with reference to the accompanying drawings.

First Embodiment

A control system for a polyolefine resin production plant according to the first embodiment of this invention will now be described with reference to FIG. 1.

Figure 1:
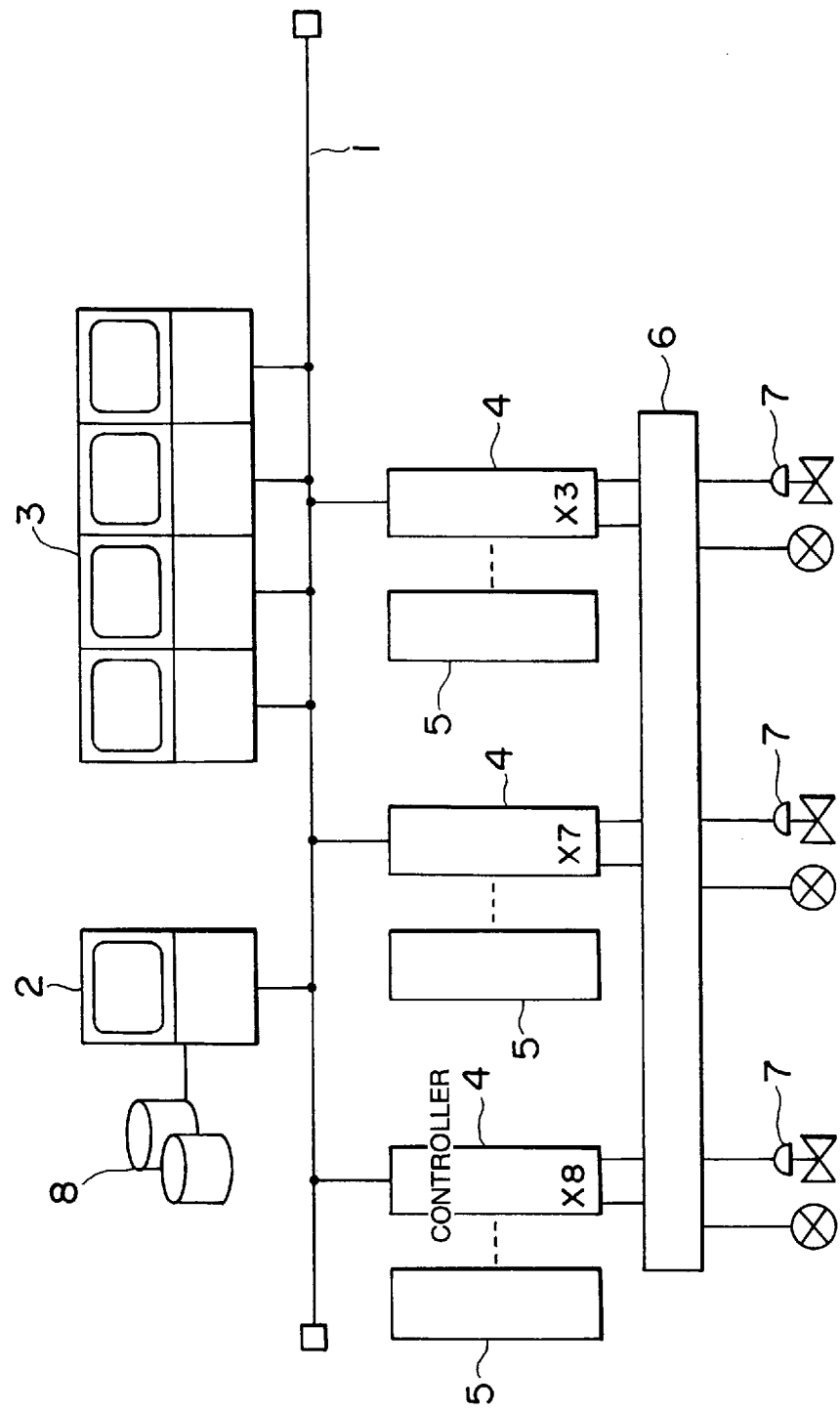
FIG. 1 is a block diagram showing the structure of a control system for a polyolefine resin production plant according to a first embodiment of this invention.

The control system in FIG. 1 comprises a bus 1, a process computer 2, an operator station 3, multifunction controllers 4, uninterrupted automatic controllers (UACs) 5, a wiring section 6, raw supply valves 7 and a magnetic disk apparatus 8.

In FIG. 1, the process computer 2 and the operator station 3 are coupled to the bus 1. The process computer 2 and operator station 3 perform the general control of the system.

Further coupled to the bus 1 is the multifunction controllers 4 which are controlled by the operator station 3. Control data for the multifunction controllers 4 are transferred to the respective uninterrupted automatic controllers 5 via the multifunction controllers 4, so that even when the multifunction controllers 4 are disabled, the uninterrupted automatic controllers 5 can perform desired processing.

The raw supply valves 7 for supplying a raw material to the plant are coupled via the wiring section 6 to the associated multifunction controllers 4, which control the opening and closing of the associated raw supply valves 7.

Figure 2:
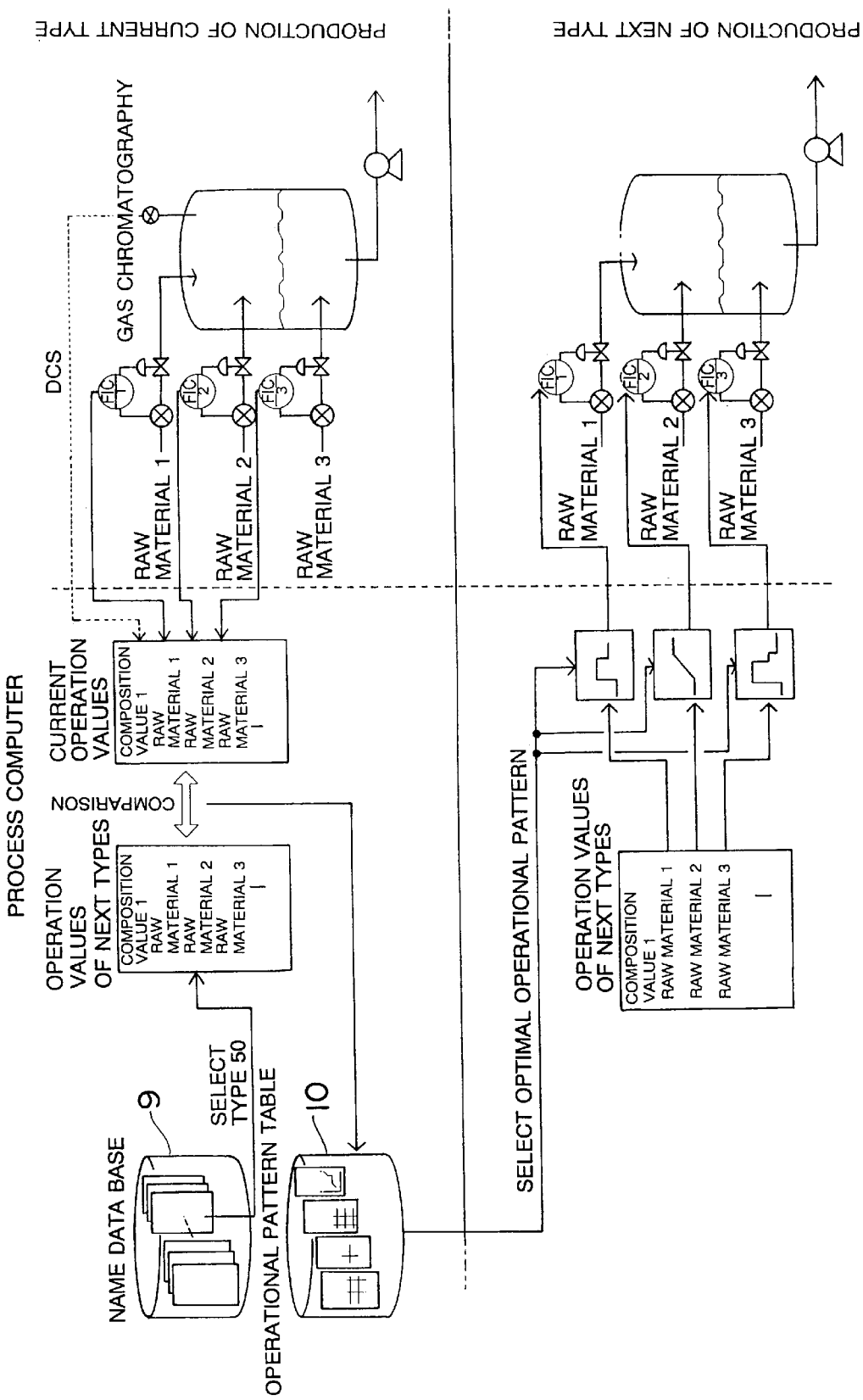
FIG. 2 is a functional block diagram for explaining the functional structure of the system in FIG. 1.

More specific functions of the control system which are realized by the above hardware structure is exemplarily illustrated in FIG. 2.

A name data base 9 and an operational pattern table 10 shown in FIG. 2 are stored in storage areas set in the magnetic disk apparatus 8 as an external memory unit of the process computer 2 shown in FIG. 1.

The names of about 100 types of resins, for example, are registered as indexes or index data in the name data base 9. The name data base 9 is a kind of an operation condition data base of each product type. For each type of resin, the specified values of plant operation process data such as the flow rate, temperature and pressure, and the target value for the product like MFR are registered in, for example, a sequential form in the name data base 9.

Operational patterns each including the operation values of a raw-material supply pattern are registered in the operational pattern table 10 each in association with the combination of the target value for a resin type and the target value for the next target resin to be changed. Each operational pattern is equivalent to the combination pattern of a composition value and a raw-material supply pattern.

The process computer 2 compares current operation process data or the operation process data of the type of the current resin with the specified value of the operation process data of the type of the next resin, reads the optimal operational pattern from the operational pattern table 10 based on the combination of the compared operation process data, and controls the multifunction controllers 4 based on the operational pattern. When the end time for the current type of resin has been set previously or the like, it is desirable that the process computer 2 should select the optimal operational pattern from the operational pattern table 10 and should select the start time for the optimal operational pattern for each selected operational pattern based on the end time for the current type of resin.

The raw-material supply pattern used in this system will now be explained with the pattern of the feed rate hydrogen taken as an example.

Figure 3:
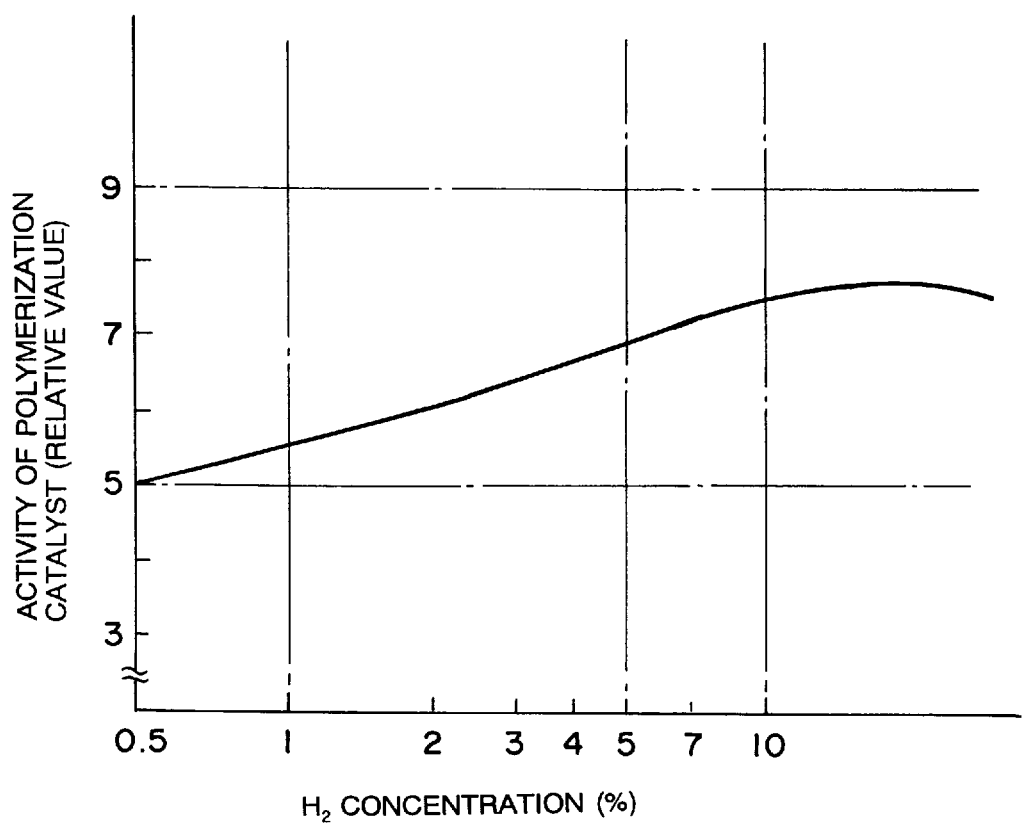
FIG. 3 is a diagram showing the relationship between the hydrogen concentration and the activity of a polymerization catalyst in the system in FIG. 1.

FIG. 3 shows the relationship between the hydrogen concentration (%) in a polymerization reactor and the activity of a polymerization catalyst (relative value) or a change in the activity of a polymerization catalyst with respect to a change in the hydrogen concentration in the polymerization reactor. The graph shown in FIG. 3 is representative of solution polymerization, slurry polymerization, bulk polymerization and gas-phase polymerization.

In FIG. 3, to reduce the molecular weight at the time of changing from one type of resin to another, for example, it should be efficient to feed the sufficient rate of hydrogen at a time until a polymer with a low molecular weight is produced. As is apparent from FIG. 3, however, as the hydrogen concentration increases, the activity of the polymerization catalyst increases and such a rapid rise in hydrogen concentration causes abnormal polymerization. It is therefore necessary to compare the hydrogen concentration at the operation value of the current type of resin with the target hydrogen concentration for the next type of resin to select the optimal supply pattern.

According to this system, the hydrogen concentration in the reactor is previously divided into a plurality of zones based on the relationship between the hydrogen concentration and the activity of a polymerization catalyst, and the optimal operational pattern obtained for each segmented zone is registered in the operational pattern table 10.

FIGS. 4A through 4D show the patterns of a change in the supply of a raw material or the patterns of a change in the feed rate of hydrogen for the individual segmented zones, which are to be registered in the operational pattern table 10.

Figure 4A:
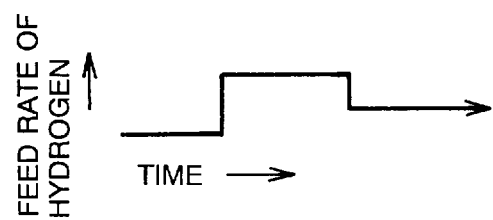
FIGS. 4A through 4D are diagrams showing different examples of a hydrogen supply operational pattern in the system in FIG. 1.
Figure 4B:
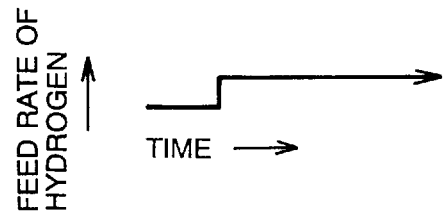

FIG. 4B shows the pattern which increases the feed rate of hydrogen in accordance with the condition for the next type of resin and is suitable in the case where the difference between the hydrogen concentration in the operation value for the current resin type and that in the target value for the next resin type is less than 0.5%.

Figure 4C:
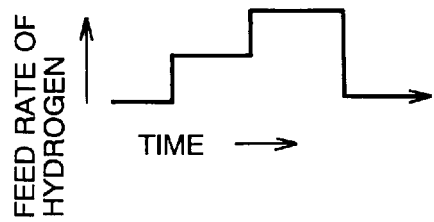

The pattern shown in FIG. 4C increases the feed rate of hydrogen in two steps and is suitable in the case where the hydrogen concentration in the operation value for the current resin type is less than 2% and the difference between the hydrogen concentration in the operation value for the current resin type and that in the target value for the next resin type is less than 0.5%.

FIG. 4A shows the pattern which temporarily overfeeds the feed rate of hydrogen and is suitable in the case where the hydrogen concentration in the operation value for the current resin type lies off the range illustrated in TABLE 1.

Figure 4D:
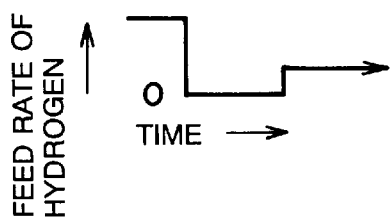

FIG. 4D shows the pattern for the case of reducing the feed rate of hydrogen.

TABLE 1 shows what patterns should be selected based on the combination of the operation value for the current resin type and the target value for the next resin type, the rightmost column showing the feed rate of hydrogen per time.

TABLE 1

| Target value for next type | Current operation value | Difference | Pattern | Hydrogen flow rate |
|---|---|---|---|---|
| less than 2% | less than 2% | less than 5% | FIG. 4B | Quickly set it to next target value |
| | | 0.5% or above | FIG. 4A | 10 Nm$^3$/Hr |
| 2% or above less than 4% | less than 2% | | FIG. 4A | 20 Nm$^3$/Hr |
| 2% or above less than 4% | 2% or above less than 4% | | FIG. 4A | 20 Nm$^3$/Hr |
| 4% or above | less than 2% | | FIG. 4C | 20 → 55 Nm$^3$/Hr |
| 4% or above | 2% or above less than 4% | | FIG. 4A | 55 Nm$^3$/Hr |
| 4% or above | 4% or above | | FIG. 4A | 55 Nm$^3$/Hr |

FIRST EXPERIMENTAL EXAMPLE

The type changing operation for changing one type of resin to another in the polymerization reactor was executed in the case where the hydrogen concentration in the operation value for the current type of resin was less than 2% and the hydrogen concentration in the operation value for the next type of resin was 4% or above.

The process computer 2 read the operation value for the current type of resin from the distributed multifunction controllers 4, read the name of the next type of resin to be changed from the name data base 9, and derived the difference between the target values of the hydrogen concentration for both resins. As a result, the pattern in FIG. 4C was selected based on the TABLE 1.

FIG. 4C shows the two-step hydrogen supply pattern in which the feed rate of hydrogen is increased to 20 Nm$^3$/Hr and the feed rate of the catalyst is reduced at the first step, causing the polymerization amount in the polymerization reactor and thus reducing the catalyst concentration, and then the feed rate of hydrogen is further increased to 55 Nm$^3$/Hr. When the hydrogen concentration reaches the target value, the feed rate of hydrogen is reduced to the specified value of 3.5 Nm$^3$/Hr, after which the feed rate of hydrogen is adjusted to provide the target hydrogen concentration.

It took 2 hours and 10 minutes for the physical property value of the produced polymer to meet the specified value under this control.

First Comparative Example

The same control as done in the first experimental example was executed with an operator manually operating only the distributed multifunction controllers.

At the time of changing one type of resin to another, the operator simultaneously changed the set values of other multiple control loops and monitored those control loops, and performed the condition changing operation while discriminating the set values from the global point of view. Because the set values should be changed in full consideration of safety, the values were set to the minimum levels from the viewpoint of safety.

In this case, to prevent abnormal polymerization, hydrogen was supplied for two hours at the rate of 20 Nm$^3$/Hr and the feed rate of hydrogen was then increased to 40 Nm$^3$/Hr while monitoring the rise in hydrogen concentration. After confirming that the hydrogen concentration rose to the specified level, the feed rate of hydrogen was dropped to 3.5 Nm$^3$/Hr.

It took 3 hours and 45 minutes under this control for the proper change of the type of a resin or for the physical property value of the product to meet the specified value.

Figure 5:
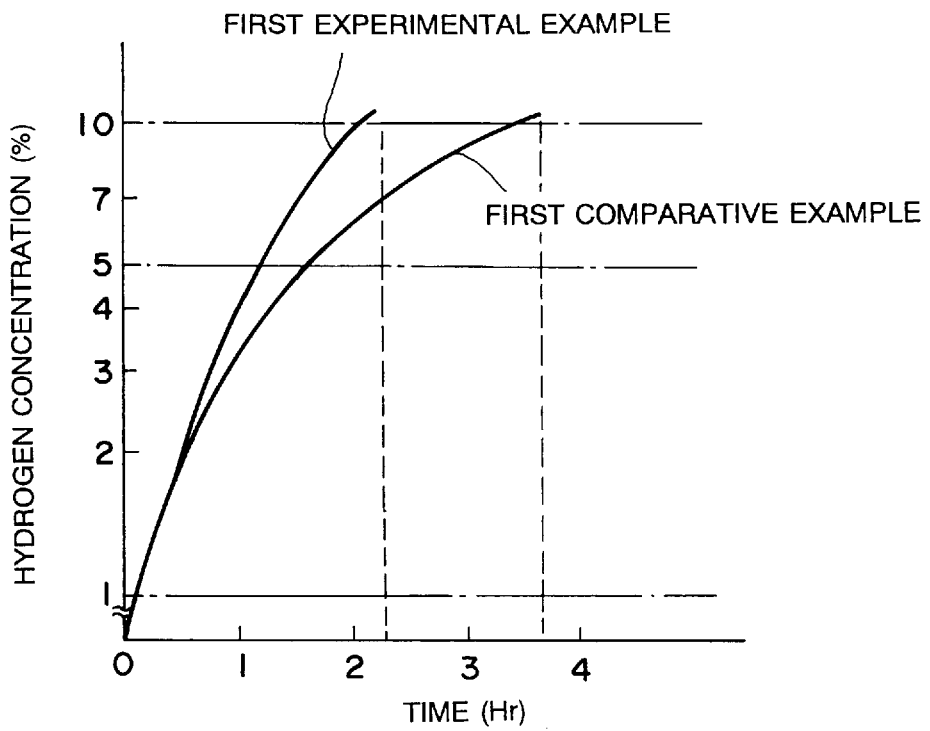
FIG. 5 is a diagram showing the relationships between time and the hydrogen concentration for a first experimental example and a first comparative example in the system in FIG. 1.

FIG. 5 shows changes in hydrogen concentration (%) of the first experimental example and the first comparative example.

It is apparent from FIG. 5 that this invention can shorten the time for the physical property value of the next type of resin to reach the specified value.

SECOND EXPERIMENTAL EXAMPLE

A product with a lower molecular weight was changed to a product with a higher molecular weight in the same system structure as used for the first experimental example.

To lower the hydrogen concentration, it is effective to temporarily stop supplying hydrogen and perform dehydrogenation. The "dehydrogenation" means to perform degassing from the polymerization reactor to discharge hydrogen together with the reactive monomer gas. This method can considerably shorten the time needed to reduce the hydrogen concentration. As this method drops the pressure in the reactor which may affect the reaction, however, a large amount of hydrogen should not be discharged. In this respect, this should be used as an auxiliary scheme.

In this experimental example, the process computer 2 selected the pattern in FIG. 4D, temporarily stopped the supply of hydrogen and performed dehydrogenation, and set the feed rate of hydrogen back to the specified value of 4.5 Nm$^3$/Hr when the hydrogen concentration became the specified level. In this case, the changing of resins from one type to another took 3 hours.

Second Comparative Example

The operator manually performed the same control as done in the second experimental example.

Because the operator should change the set values of other multiple control loops and monitor those control loops at the time of changing one type of resin to another in this case too, the operator performed only the operation to temporarily stop the supply of hydrogen first, and then returned the feed rate of hydrogen to the specified value of 4.5 Nm$^3$/Hr.

It took 5.5 hours to complete the proper change of the type of a resin in this case.

Figure 6:
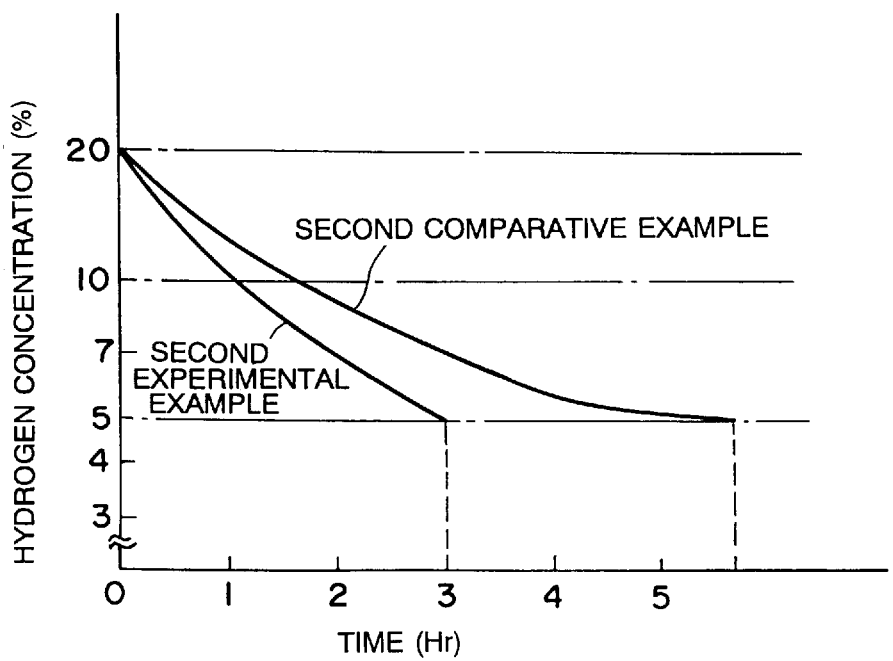
FIG. 6 is a diagram showing the relationships between time and the hydrogen concentration for a second experimental example and a second comparative example in the system in FIG. 1.

FIG. 6 shows successive changes in hydrogen concentration (%) of the second experimental example and the second comparative example. It is apparent from FIG. 6 that this invention can shorten the time for the physical property value of the next type of resin to reach the specified value.

The system shown in FIG. 1 may be realized by connecting a process computer to the bus of a conventional distributed control system so that this process computer accomplish the type change control.

In executing the type change control, the operation process data of the current type of resin is compared with the specified value of the operation process data of the next type of resin and the difference between both values is obtained to select the proper operational pattern.

Operational patterns to be registered in the operational pattern table are what is need for the operation process data of the plant, after changing, to reach the specified value of the operation process data of the next type of resin to be produced in order to ensure the continuous transition to the operation for the next type of resin without stopping the operation even after the completion of the operation for the current type of resin. They are considered the optimal operational patterns in that the quantity of products which do not meet the standards and are produced at proper time of changing the types of resins and in that the transition to the operation of producing the next type of resin is accomplished safely and efficiently. The operational patterns are obtained by dividing the conditions for changing operation process data into several types of patterns.

As the target value of each type of resin and a successive change in the feed rate of each raw material are registered in the operational pattern table, it is possible to register the operational pattern which is based on the result of the analysis previously done through the manual operation for each type of resin. This can ensure the control that does not depend on the skill levels of the individual operators.

Second Embodiment

A control system for a polyolefine resin production plant according to the second embodiment of this invention will be described below.

The second embodiment is adapted to a continuous polymerization system for polymers which automatically changes polymers from one type to another in the continuous polymerization.

Polymers or high-molecular materials are produced by polymerization. Polymers can be produced by continuous polymerization in the polymerization reactor. This continuous polymerization sequentially produces plural types of polymers which have different molecular weights and different densities.

The switching of compositions in the polymerization reactor should be executed promptly and stably in the continuous polymerization in order to reduce the number of transition products (the off-standards products which are produced transiently at the time of switching from one type of polymer to another) as much as possible when one polymer is changed to another.

For example, the ratio of feed rates of supplied gases, such as the ratio of the feed rates of hydrogen, ethylene and propylene in changing the molecular weight or the ratio of the feed rates of propylene and ethylene in changing the molecular weight/density corresponds to a change in composition in the polymerization reactor and becomes an index for changing the polymer type or the transition.

There is one conventional continuous polymerization technique which over-supplies a catalyst, hydrogen or propylene for a certain period of time in order to cause the ratio of the value measured by a gas chromatography (hereinafter called "gas chromatographic ratio") to approach the target value for the type of a transition product by adjusting the feed rate of the catalyst, the feed rate of hydrogen, the feed rate of propylene or the like with the feed rate of ethylene kept constant, and then returns that ratio to said target value.

As already mentioned, conventionally, switching the polymer type is manually performed by an operator and thus greatly depends on the knowledge- and experience-based skill of that operator. Accordingly, the time for the transition varies depending on operators, thus making it difficult to stabilize the qualities of products around the transition for some operators.

Figure 7:
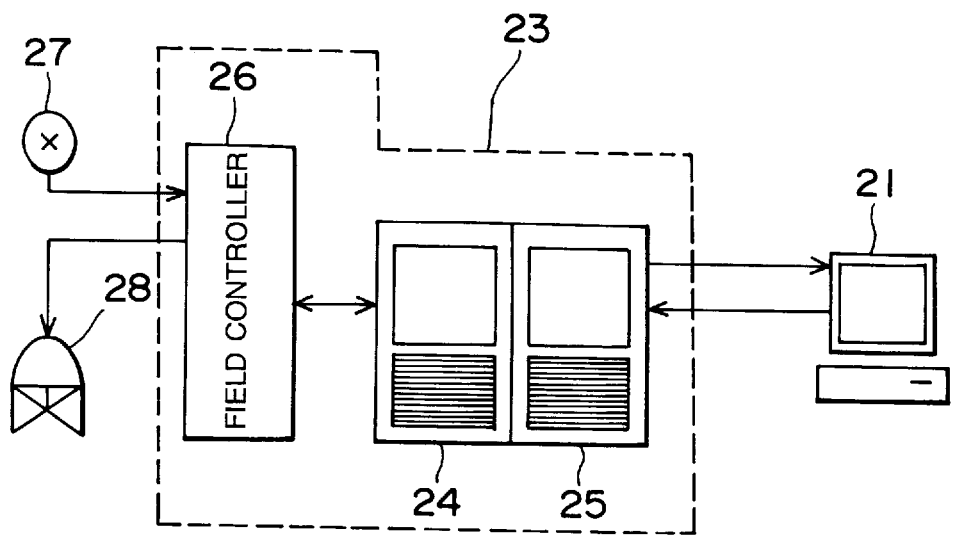
FIG. 7 is a block diagram showing the structure of a control system for a polyolefine resin production plant according to a second embodiment of this invention.

In this respect, the second embodiment of this invention provides a continuous polymerization system for polymers which is capable of automatically and quickly switches one type of polymer to another in the continuous polymerization while improving the quality of the products. That is, the second embodiment is a continuous polymerization system for polymers to which the control system of this invention for a polyolefine resin production plant is applied. FIG. 7 shows the hardware structure of the second embodiment.

The continuous polymerization system for polymers sequentially produces different types of polymers through the continuous polymerization which is accomplished by continuously switching compositions in the polymerization reactor.

The continuous polymerization system for polymers in FIG. 7 includes a model algorithm control section (hereinafter called "MAC section") 21, a distributed control system section (hereinafter called "DCS section") 23, and a polymerization reactor 28.

The MAC section 21 sets a model pattern for the DCS section 23 and performs fuzzy control. Accordingly, the MAC section 21 manages model pattern parameters, fuzzy parameters and a name condition file and manages the fuzzy control.

The DCS section 23 executes model-pattern based program control to perform the general control of the system and the sequence control.

The MAC section 21 executes the model predictive control using a model pattern obtained by patterning the overaction part in a test sequence prepared by the DCS section 23.

The "model pattern" is the operational pattern of the feed rates of hydrogen and propylene set on the basis of the past achievements for the individual polymer types. A scheme of patterning the transitional operations based on the experiences of skillful operators to construct models for the individual polymer types belongs to the model predictive control. For the optimization purpose, a control apparatus which employs the model predictive control should be used.

Figure 8:
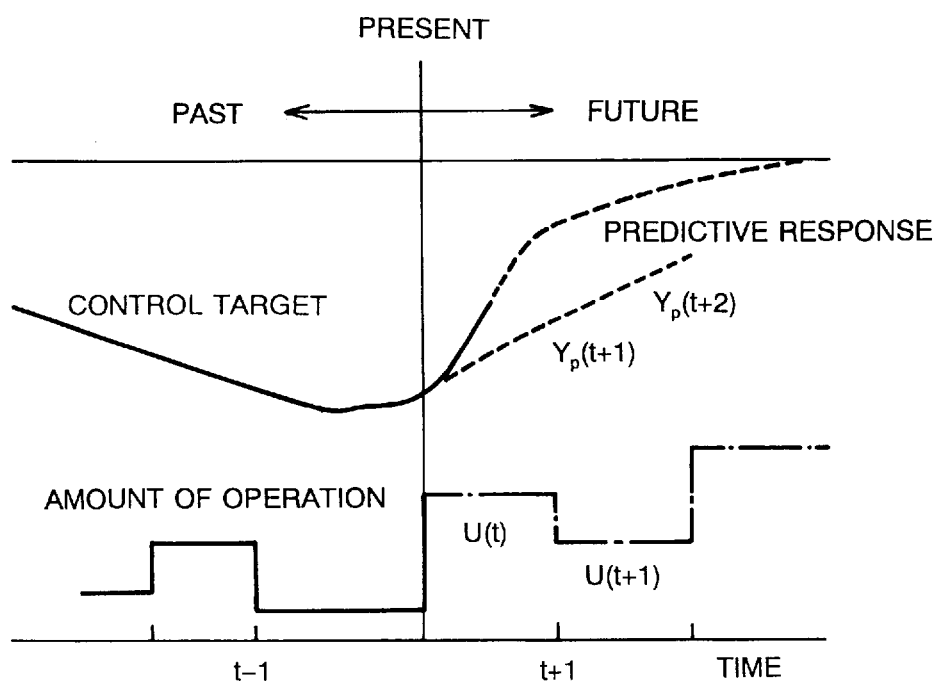
FIG. 8 is a diagram for explaining the concept of a model predictive control in the system in FIG. 7.

The model predictive control includes MAC (Model Algorithmic Control) and DMC (Dynamic Matrix Control), for example. The typical method for the model predictive control uses the dynamic characteristic model of the process in the control algorithm to predict the future behaviors $Y_P(t)$, $Y_P(t+1)$, ... of a control target from the previous operational data and to control it within a finite time, as illustrated in FIG. 8.

With the use of the model pattern alone, the fuzzy control in the MAC section 21 cannot cope with the control of the physical property which changes from time to time. Therefore, the fuzzy control is used to control the physical property to the target value. In the fuzzy control, membership functions and fuzzy rules are set in association with the manual control operation so as to achieve a human-like control operation.

The continuous polymerization system for polymers performs a fuzzy operation on the process feedback values and reflects the operation results on the process. More specifically, the continuous polymerization system for polymers executes sequence control which performs control based on model patterns attained from the past operational achievement data for the individual polymer types and indirect advanced control which performs a fuzzy operation at a higher level than the sequence control and sets the operation results in the DCS section 23 for advanced control.

The DCS section 23 may be constructed by using a general-purpose computer system (e.g., "CENTUM" (product of YOKOGAWA ELECTRIC CO.) or "TDCS" (product of YAMATAKE HONEYWELL CO.)), which includes an operator station 24, an operator console 25 and a field controller 26.

The field controller 26 has a batch setter 55 to be discussed later.

The MAC section 21 has a hard disk drive, a random access memory and an RS71 interface card, though not illustrated, and operates the system based on software. The software includes a line controller, BASIC interpreter, an interface card utility, an interactive graphics utility, a trend library, a data base utility, DOS (Disk Operating System), a conversion utility, a shell and a fuzzy processing program (such as "AdMAS" which is a packaged program).

A catalyst, hydrogen, ethylene and propylene monomer or the like are properly supplied to the polymerization reactor 28 for polymerization. The field controller 26 receives data such as the feed rate of the catalyst, the feed rate of hydrogen, the feed rate of propylene and the like. The field controller 26 controls the pressure and the temperature in the polymerization reactor 28, and the gas chromatographic ratio.

The polymerization reactor 28 performs continuous polymerization. The polymer may be polyolefine which is a high-molecule compound obtained by the polymerization of α-olefines each of which has a carbon-carbon double bond in the molecules. Polyolefine includes low-density polyethylene which is synthesized by radical polymerization. The polyolefine may also be polyethylene having an intermediate or high density or a polyolefine wax.

The functional structure of the continuous polymerization system for polymers that can be achieved by software will now be described.

Figure 9:
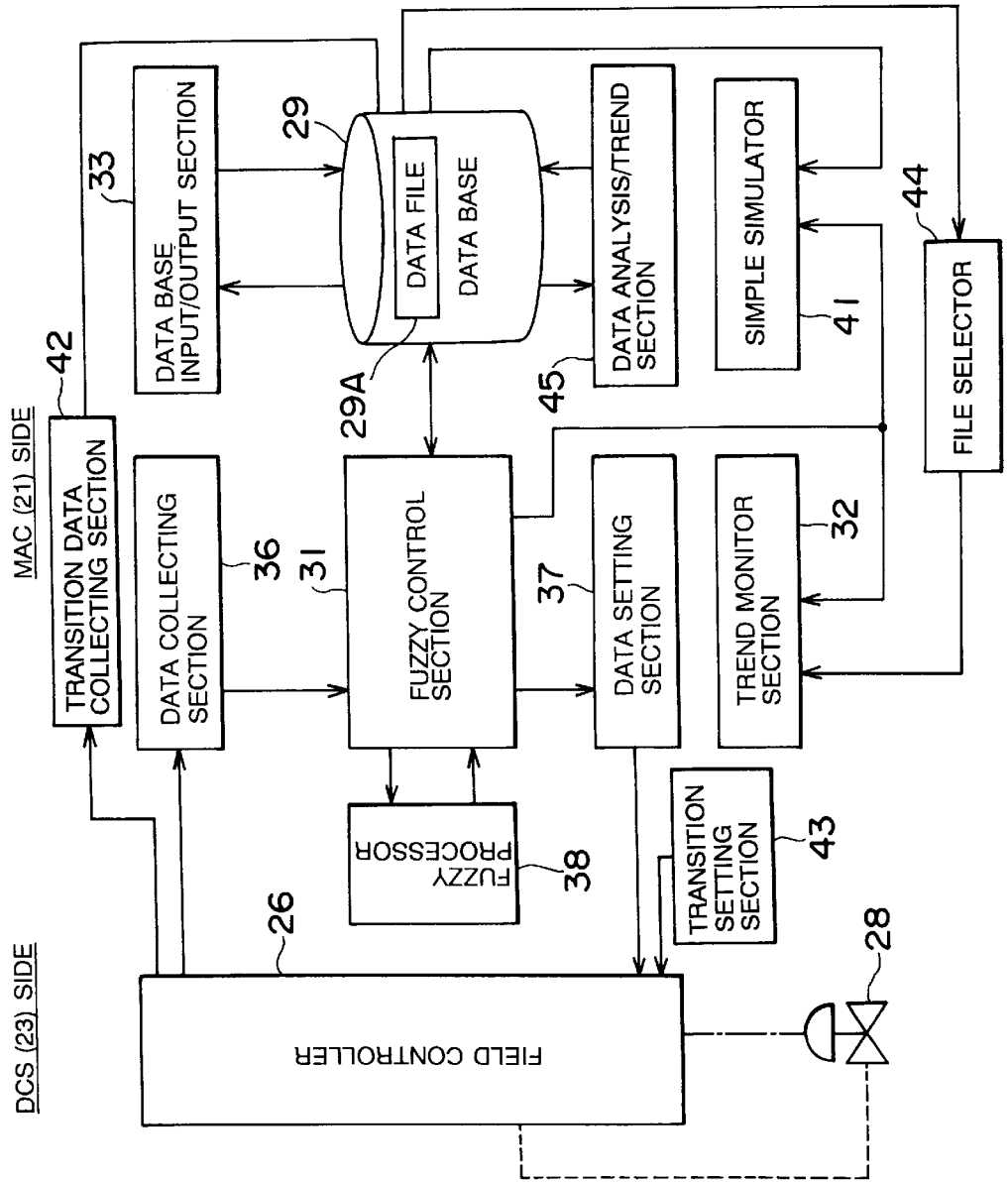
FIG. 9 is a functional block diagram for explaining the functional structure of a part of the system in FIG. 7.
Figure 10:
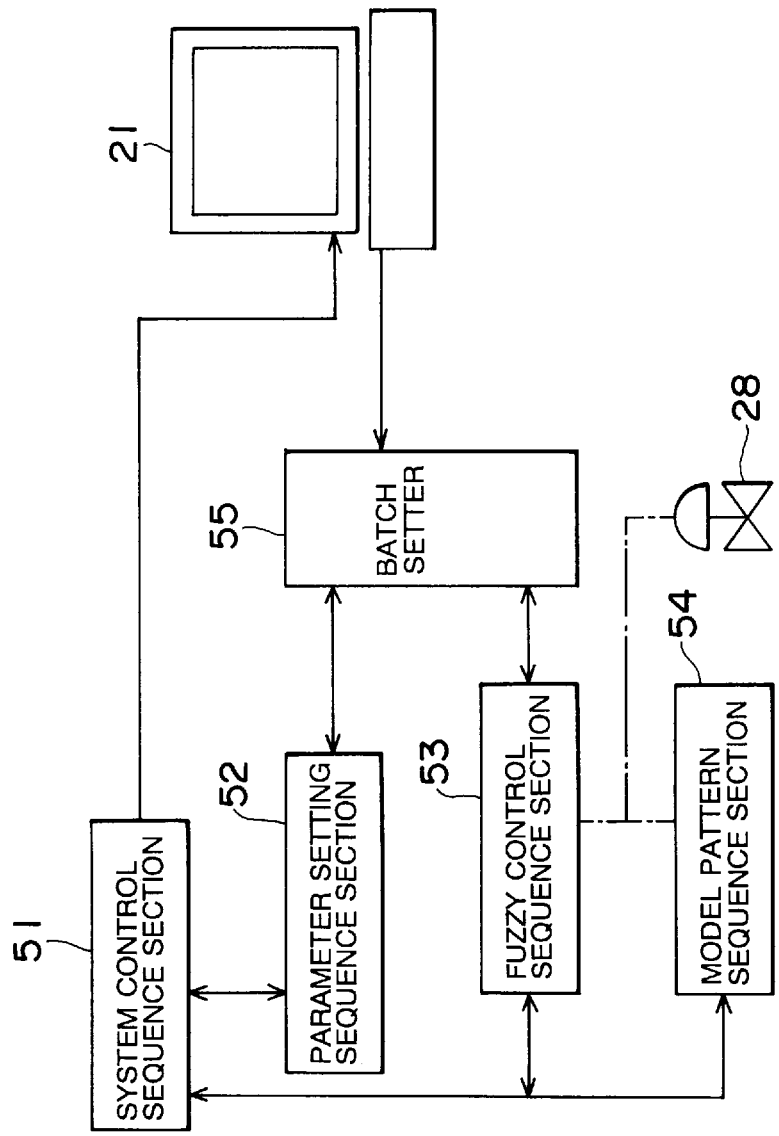
FIG. 10 is a functional block diagram for explaining the functional structure of another part of the system in FIG. 7.

FIG. 9 shows the functional structure of the MAC section 21, and FIG. 10 shows the functional structure of the DCS section 23.

The software of the continuous polymerization system for polymers includes the MAC function portion shown in FIG. 9 and the DCS sequence function portion also shown in FIG. 9. The MAC function portion includes a data base 29, a fuzzy control section 31, a trend monitor section 32, a data base input/output section 33, a data collecting section 36, a data setting section 37, a fuzzy processor 38, a simple simulator 41 a transition data collecting section 42, a transition setting section 43, a file selector 44 and a data analysis/trend section 45.

The fuzzy control section 31 manages the data input/output of the fuzzy processor 38 and name condition parameters, and performs fuzzy control like data processing and operation and pressure control of model patterns. In other words, the fuzzy control section 31 executes fuzzy control in such a way that sub-parameters like the gas chromatographic ratio, pressure and temperature, which change in accordance with the values of control parameters like the feed rate of hydrogen and the feed rate of a catalyst, are permitted to approach the target values associated with the next type of polymer to be changed, upon passage of a predetermined time after the values of the control parameters change.

The trend monitor section 32 presents the trend display of the transition status in real time to display the contents and status of the fuzzy control.

The data base input/output section 33 manages the input/output access to a data file 29A in the data base 29, such as the aforementioned model pattern parameters and name operation condition data, and inputs and changes those data.

The simple simulator 41 has a process simulation function to store a simple model equation and a processing model equation of the process simulation, infer the physical property of a polymer and inspect the fuzzy output.

The data collecting section 36 collects data from the DCS section 23 through the communications software that is invoked on the line controller and stores the data in a common area. That is, the data collecting section 36 serves as a detecting section to detect the values of the aforementioned sub-parameters.

The fuzzy processor 38 incorporates a fuzzy operation section which is provided as a subprogram of the fuzzy processing program, and executes a fuzzy operation under the control of the fuzzy control section 31. That is, the values of the aforementioned control parameters are attained from the fuzzy operation on the values of the sub-parameters that are collected by the data collecting section 36.

The data setting section 37 sets the model pattern data of the type of a resin and the values obtained through the fuzzy operation into the batch setter 55 of the field controller 26.

The fuzzy processing program builds fuzzy rules, membership functions and the like. Each fuzzy rule has a condition (IF) part and a conclusion (THEN) part each consisting of a fuzzy set.

The following are some examples of fuzzy rules.
Rule 1
  IF x is $A_1$ and y is $B_1$ THEN z is $C_1$
Rule 2
  IF x is $A_2$ and y is $B_2$ THEN z is $C_2$ Both rules have two condition part variables "x is A" and "y is B" and one conclusion part variable "z is C." In the rules, $A_1$, $A_2$, $B_1$, $B_2$, $C_1$ and $C_2$ are fuzzy sets.

The membership functions define the parts of a fuzzy rule for quantization.

The fuzzy operation obtains the matchability ("goodness" of fit) of the condition part of each rule with given values, obtains the inference result of each rule based on the attained matchability, and then attains the final inference result from the inference result of each rule.

The simple simulator 41 inputs data from the transition data file 29A to the fuzzy processor 38, provides the trend display of the output values on the trend monitor section 32 and adjusts the setting of the membership functions and fuzzy rules for the fuzzy control based on the displayed results.

The transition data collecting section 42 stores, for example, 88 pieces of data from one hour before the beginning of the transition up to the end of the transition into the data file 29A in the data base 29. The transition setting section 43 sets the trend name and the time for starting the data collection.

The file selector 44 selects the transition data file 29A to be displayed. The data analysis/trend section 45 presents the trend display of the transition data of the designated name in the data file 29A.

Then, the DCS sequence section 50 has a system control sequence section 51, a parameter setting sequence section 52, a fuzzy control sequence section 53, a model pattern sequence section 54 and the aforementioned batch setter 55.

The fuzzy control sequence section 53 and model pattern sequence section 54 control the polymerization reactor 28.

The system control sequence section 51 controls the selection of the resin type, the selection of the sequence in use, the start and stop of the sequence, the selection of a model pattern parameter and the communication with the MAC section 21. The resin type is managed by an 8-bit code; a binary code is handled with a type number in a decimal notation.

The parameter setting sequence section 52 communicates with the MAC section 21 upon the initiation of the sequence after a resin type is selected, and sets model pattern parameters in the batch setter 55 of the DCS section 23.

The parameter setting sequence section 52 sets the same value as two model pattern parameters in the batch setter 55. This sequence section 52 compares the two values, set in the batch setter 55, with each other and determines that the proper communication has been accomplished when those two values are the same, and sets this value in a program setter (not shown). When the two model pattern parameters in the batch setter 55 differ from each other, the sequence section 52 sends a communication error message to the MAC section 21 and retries the communication.

The fuzzy control sequence section 53 manages the fuzzy operation values which are to be set by the data setting section 37 of the MAC section 21 and causes the batch setter 55 to write in a control tag. This sequence section 53 is enabled when a predetermined period of time passes after the setting of the model pattern parameters, and controls the communication between the MAC section 21 and the DCS section 23.

The model pattern sequence section 54 is a patterning sequence which optimizes the patterning and constructs a model pattern for the resin types whose fuzzy parameters have not been built yet. This sequence section 54 changes the values of control parameters based on the model pattern for each type at the time of switching one type of polymer to another in the continuous polymerization.

The control operation for the continuous polymerization in the continuous polymerization system for polymers will now be discussed.

Figure 11:
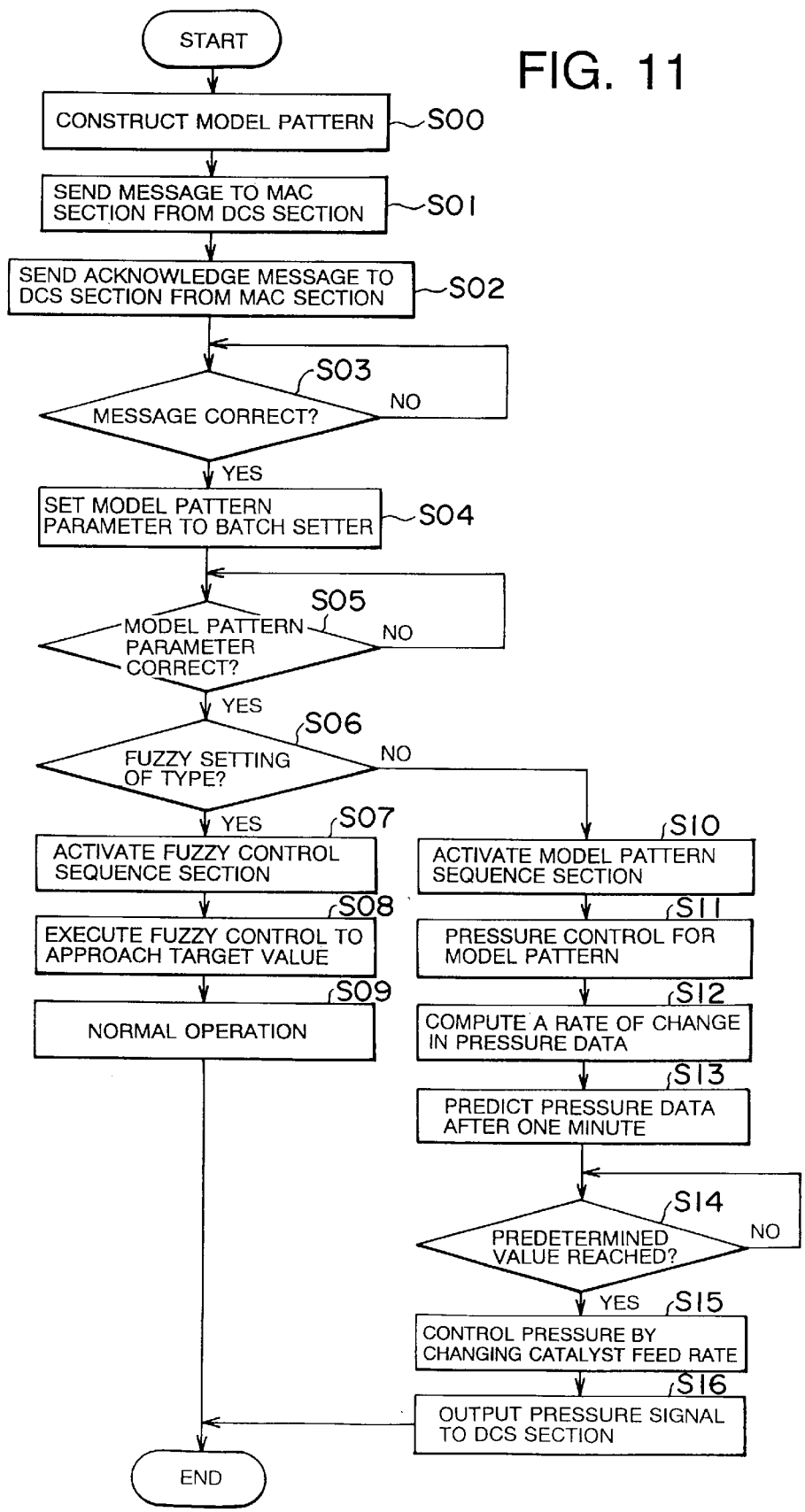
FIG. 11 is a flowchart for explaining the operation of the system in FIG. 7.
Figure 12:
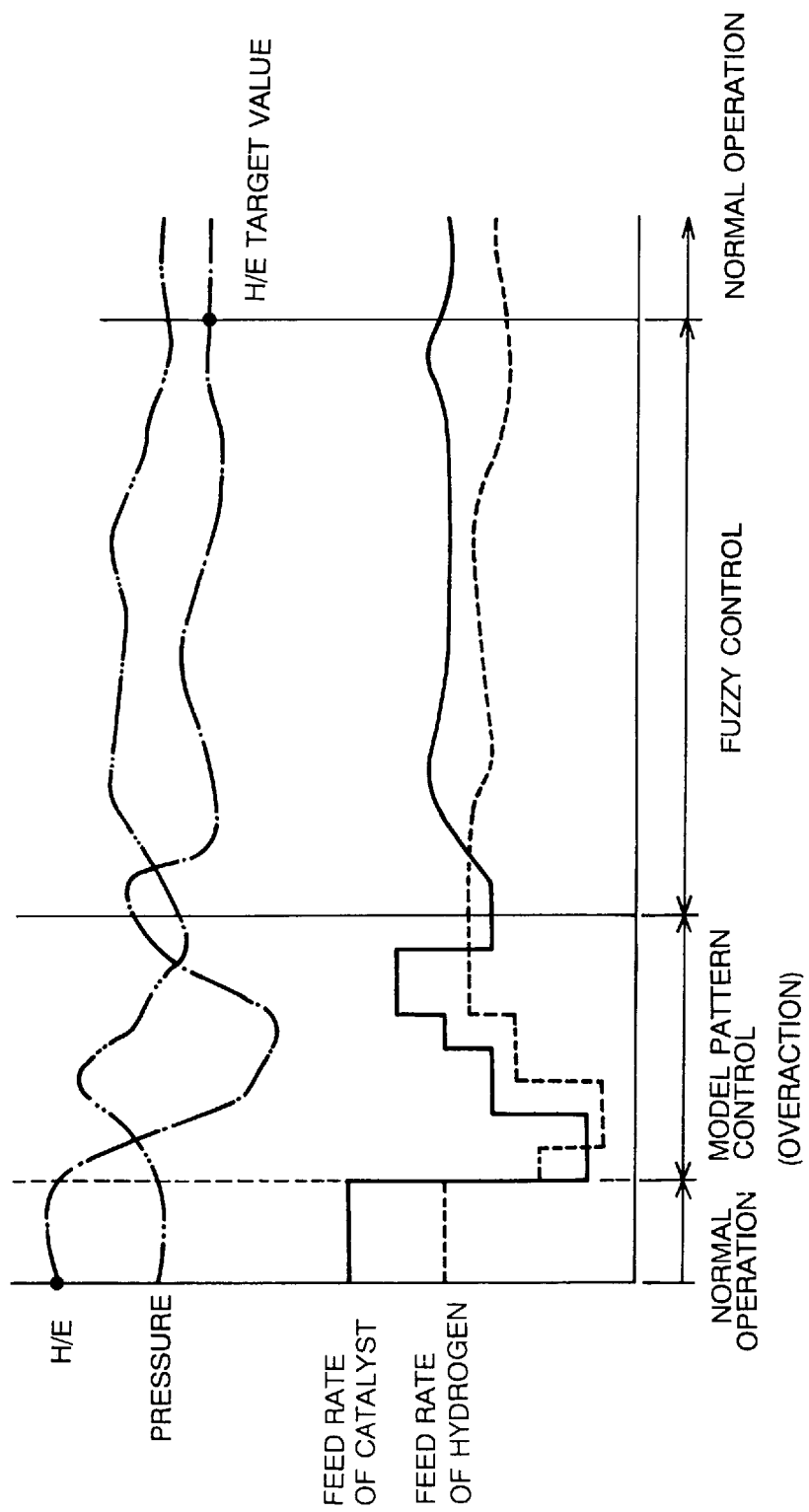
FIG. 12 is a diagram for explaining a control operation for a polymerization transition in the system in FIG. 7.

FIG. 11 is a flowchart illustrating the continuous polymerization control, and FIG. 12 illustrates the control characteristic of the polymerization transition.

First, the MAC section 21 builds model patterns (step S00). In this case, the test pattern sequence performed patterning for 18 types, for example. Further, the patterning was performed with respect to 3 parameters: the feed rate of hydrogen, the feed rate of a catalyst and the feed rate of propylene.

Figure 13:
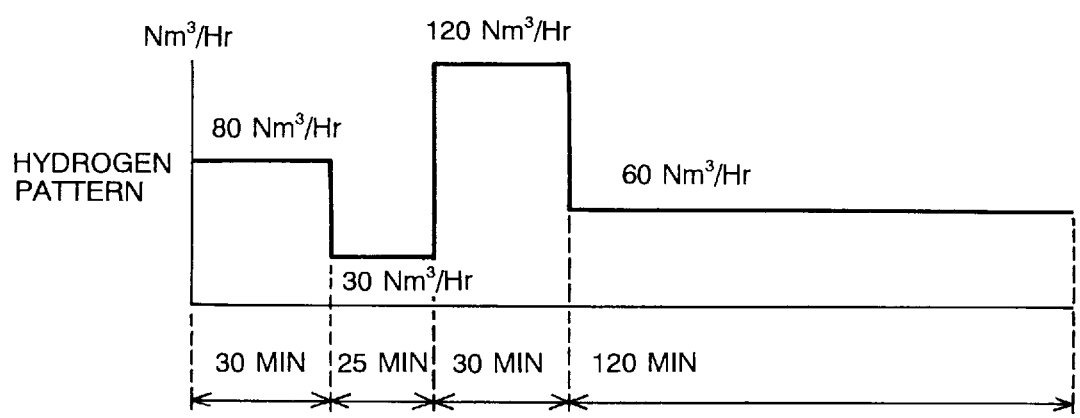
FIG. 13 is a diagram for explaining the control operation of the system in FIG. 7.

FIG. 13 exemplifies a model pattern for hydrogen. As shown in FIG. 13, the hydrogen pattern indicates the hydrogen supply of 30 $Nm^3/Hr$ for 25 minutes and the hydrogen supply of 120 $Nm^3/Hr$ for 30 minutes at the time of overaction.

With regard to the catalyst, the activity always varies, making it difficult to previously determine the feed rate. Therefore, the ratio of a change in activity is factorized based on the past achievements, and the feed rate is computed by the MAC section 21 spontaneously upon the activity at the transition time. The computed feed rate is set in the DCS section 23.

Because the constructed model pattern has been optimized to a certain degree from past achievements, the polymerization transition time can be shortened. For instance, the time needed for the transition work (including feed-down and feed-up) is about 12 hours on average. The automation system for transition polymerization shortens this transition time to 10 hours, two hours shorter.

The setting of the transition type, and the start and stop of the sequence are executed on the screen of the operator station 24 and a message is sent to the MAC section 21 from the DCS section 23 (step S01).

The MAC section 21 receives the message from the DCS section 23 and sends an acknowledge message to the DCS section 23 (step S02).

Next, the MAC section 21 determines if the message from the DCS section 23 is correct (step S03). When the message from the DCS section 23 is correct, the data setting section 37 in the MAC section 21 sets model pattern parameters in the batch setter 55 in the DCS section 23 (step S04). In this example, two same model pattern parameters are set in the batch setter 55.

Then, the DCS section 23 determines if the set model pattern parameters have been transferred by comparing a flag with the two same model pattern parameters (step S05).

When the model pattern parameters have been transferred properly, it is determined if fuzzy setting of the type has been performed (step S06). When this fuzzy setting has been done, the system control sequence section 51 selects and invokes the fuzzy control sequence section 53 (step S07).

When the fuzzy control sequence section 53 is selected, the transition operation is initiated with the previously defined model pattern and is switched to fuzzy control after a predetermined period of time (step S08).

More specifically, overaction is performed to change the feed condition to the condition for the next type of product in the initial state at the time of transition, and after the passage of the predetermined period of time, fuzzy control is performed to set the gas flow rate to the H/E target value shown in FIG. 12.

The "predetermined period of time" is the time for setting the control target value to the value for the next type of product upon the execution of the overaction after the initiation of the transition, and is set for each type.

In this case, the fuzzy control section 31 executes the gas chromatography control (H/E control) and pressure control based on the control algorithm during the fuzzy control period as shown in FIG. 12. The control algorithm can be changed for fine adjustment even during operation. The control cycle is separated into two parts for the gas chromatography control and pressure control, each of which can be set arbitrarily. For example, the chromatography control is carried out every 3 minutes while the pressure control is executed every minute.

When the physical property reaches the target value and becomes stable, the transition is ended and the normal operation is initiated (step S09). The fuzzy control continues even in the normal operation to perform stabilization control of this operation.

The fuzzy control sequence continues until the feed-up, the feed-down and the next transition. When the fuzzy control sequence is stopped arbitrarily based on the control table, control is switched to ordinary control by manual operation.

When fuzzy setting has not bee made, the system control sequence section 51 selects and invokes the model pattern sequence section 54 (step S10).

This sequence section 54 starts the model pattern control shown in FIG. 12 at the time of overaction (step S11). In the pattern compensation in this case, the pressure of n minutes later is inferred for the pressure control.

Since overaction is taken in the predetermined period of time, the physical property is not controlled and only the pressure in the polymerization reactor is controlled.

The data collecting section 36 of the high-rank MAC section 21 collects, for example, five pieces of pressure data each obtained every minute and outputs the ratio of change in the collected pressure data (step S12).

Pressure change for one minute:
$dp1=P-P1$, $dp2=P1-P2$, $dp3=P2-P3$, $dp4=P3-P4$, $dp5=P5-P6$ Then, the data collecting section 36 infers the pressure one minute later from the current point, based on the data on the ratio of change (step S13).

Inferred pressure after one minute:
$AVPA=SUM(dp1, dp2, dp3, dp4, dp5)/5+$reactor pressure D201PS The data collecting section 36 determines if the inferred pressure value has reached the pressure point (upper limit/lower limit) previously determined by the type condition (step S14).

At this point of time, the data collecting section 36 changes the amount of the catalyst to control the pressure (step S15). The amount of a single operation of the feed rate of the catalyst was the finite difference between the first point and the second point in the model pattern based on the past achievements.

When the pressure reaches the point determined by the type condition, the MAC section 21 outputs an upper-limit pressure signal and a lower-limit pressure signal to the DCS section 23 to perform the sequence-based control (step S16).

Since the gas chromatography control is not executed during this period, manual operation is necessary when the operation enters the stable state. The pattern sequence is used to optimize the model pattern, not for automation.

The automation of the polymerization transition is carried out by the construction of the model patterns and the fuzzy control. The pattern of the test sequence which has constructed the model patterns under the model-pattern based program control can be automatically set by the MAC section 21 to be used for the optimization of the type-by-type patterns.

It is therefore possible to develop a scheme of constructing the fuzzy parameters for the automatic switching of polymers as needed, even for other types of polymers than the typical polymers which are automatically changed from one to another.

During the predetermined period of time, only the pressure in the polymerization reactor as a sub-parameter is controlled by changing the control parameters but the physical property is not controlled, so that the transition time can be shortened.

The system may also use a feed rate of at least one of α-olefines having 2–8 carbon atoms, e.g., ethylene, propylene, butylene and the like, as the control parameter.

It is apparent that, in this invention, a wide range of different working modes can be formed based on the invention without deviating from the spirit and scope of the invention.

What is claimed is:

1. A control method for a polyolefine resin production plant for switching between production of two of a plurality of polyolefin resins comprising the steps of:

(a) registering, in advance, names of the plurality of polyolefin resins producible by the polyolefine resin production plant in a name data base as index data;

(b) storing, in advance, an operational pattern for each optimal type changing operation as an operational pattern table into a pattern storage for each combination of a name of a current resin under production by the polyolefin resin production plant and a name of a next target resin to be produced by the polyolefin resin production plant;

(c) producing the current resin in the polyolefin resin production plant;

(d) comparing the name of the current resin with the name of the next target resin to discriminate a combination result thereof and selecting an operational pattern, corresponding to the discrimination result, from the operational pattern table;

(e) executing process control, including adjusting process inputs, according to the operational pattern selected in said comparing and selecting step, to change a type of a resin being produced by the polyolefin resin production plant from the current resin to the target resin; and (f) producing the target resin in the polyolefin resin production plant.

2. The control method of claim 1, wherein each operation pattern to be stored in the operational pattern table includes a control target value for each of the plurality of polyolefin resins and information on a successive change in a feed rate of a raw material.

3. The control method of claim 2, wherein said comparing and selecting step includes a sub-step of (d)(1) setting a start time for control by the operational pattern selected for a type changing operation to an optimal time for each operational pattern based on a production end time for the current resin.

4. The control method of claim 2, wherein the polyolefin resin production plant is used to produce the plurality of polyolefin resins, which are different from one another in at least one of a molecular weight and a copolymer composition of polyolefin; and said storing step includes a sub-step of (b)(1) registering an optimal operational pattern for each of a plurality of zones, obtained by previously dividing a hydrogen concentration in a polymerization reactor of the polyolefin resin production plant, based on at least a relationship between a hydrogen concentration and activity of a polymerization catalyst, into the operational pattern table.

5. The control method of claim 4, wherein the polyolefin resin production plant is used to produce a plurality of polypropylene resins different from one another in at least one of a molecular weight and a copolymer composition of polypropylene.

6. A control method for a polyolefin resin production plant for continuously changing a composition of a supplied element in a polymerization reactor for continuous polymerization to thereby switch between production of different types of polymers, said method comprising the steps of:

(a) producing one of the different types of polymers in the polyolefin resin production plant;

(b) changing a control parameter based on an operational pattern by a changing operation model for each previously stored resin name, at a time one type of resin is changed to a target resin type during continuous polymerization;

(c) continuously detecting and monitoring a sub-parameter which changes in accordance with a change in the control parameter;

(d) performing fuzzy control of an operation based on said changing step such that when a predetermined period of time passes after a change in the control parameter, the control parameter and the sub-parameter approach target values corresponding to the target resin type; and (e) producing another one of the different types of polymers in the polymerization reactor from the target resin type, the control parameter and the sub-parameter.

7. The control method of claim 6, wherein said performing fuzzy control step includes the sub-steps of:

(d)(1) performing a fuzzy operation on the sub-parameter detected by said continuously detecting and monitoring step to obtain information on the control parameter; and (d)(2) changing the control parameter obtained in said step (d)(1).

8. The control method of claim 6, wherein the predetermined period of time is a time from a point at which changing a resin type starts to a point at which the target values are set to values according to the target resin type after overaction of the control parameter.

9. The control method of claim 8, further including the of (f) changing the control parameter to control only a pressure in the polymerization reactor as the sub-parameter during the predetermined period of time.

10. The control method of clam 6, wherein the operational pattern obtained based on past production achievements.

11. The control method of claim 6, wherein the different types of polymers are polypropylenes, polyethylenes and polyethylene waxes.

12. The control method of claim 6, wherein the control parameter is a feed rate of hydrogen.

13. The control method of claim 6, wherein the control parameter is a feed rate of a catalyst.

14. The control method of claim 11, wherein the control parameter is a feed rate of at least one of α-olefines having 2–8 carbon atoms.

15. The control method of claim 6, wherein the sub-parameter is one of a ratio of hydrogen to propylene and a ratio of hydrogen to ethylene.

16. The control method of claim 6, wherein the sub-parameter is at least one of a pressure and a temperature in the polymerization reactor.

* * * * *

UNITED STATES PATENT AND TRADEMARK OFFICE
CERTIFICATE OF CORRECTION

PATENT NO : 5,830,954
DATED : November 3, 1998
INVENTOR(S): Shigeki HAYASHI et al.

It is certified that error appears in the above-identified patent and that said Letters Patent is hereby corrected as shown below:

On the title page,
Please change the third inventor's name from "Hiroyuki Mizouchi" to --Hiroyuki Mizuochi--.

Signed and Sealed this

First Day of June, 1999

Attest:

Q. TODD DICKINSON

*Attesting Officer*  *Acting Commissioner of Patents and Trademarks*